UNITED STATES PATENT OFFICE.

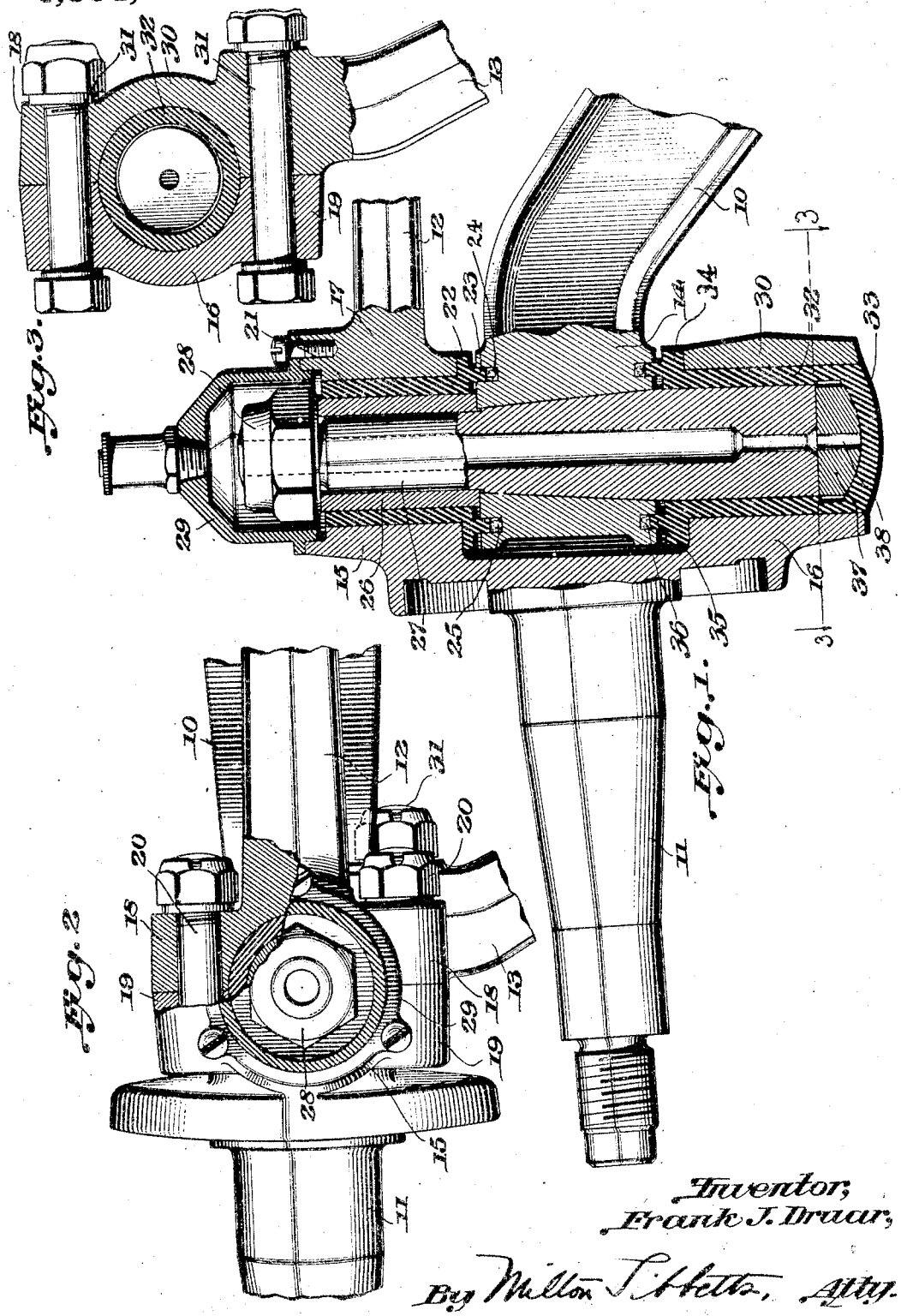

FRANK J. DRUAR, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,384,309.

Specification of Letters Patent.   Patented July 12, 1921.

Application filed February 10, 1919.   Serial No. 275,941.

*To all whom it may concern:*

Be it known that I, FRANK J. DRUAR, a citizen of the United States, and resident of Detroit, Wayne county, State of Michigan, have invented certain new and useful Improvements in Motor-Vehicles, of which the following is a specification.

This invention relates to motor vehicles and particularly to improvements in the steering knuckles thereof.

One object of the invention is to provide an improved form of oil retainer for the lower end of the pivot pin.

Another object of the invention is to provide a thrust plate adapted to have a bearing against said oil retainer and which is provided with a surface which will center the thrust plate as the same wears away.

Another object of the invention is to provide effective means for closing the knuckle against the entrance of dirt or dust.

With these objects and others in view, the invention is embodied in preferable form in the construction and arrangement hereinafter described and illustrated in the accompanying drawings, in which—

Figure 1 is a vertical section partly in side elevation of a knuckle showing my improvements applied thereto;

Fig. 2 is a top plan view partly broken away along a horizontal line; and

Fig. 3 is a horizontal section on the line 3—3 of Fig. 1.

Referring to the drawings, 10 is an axle, 11 a spindle, 12 a steering lever, and 13 an arm from the cross steering tube.

The axle is provided with an annular integral knuckle member section 14 and the spindle is provided with an integral knuckle portion of which 15 indicates the upper half and 16 the lower section.

The steering lever has a knuckle member section 17 provided with ears 18 adapted to be clamped to ears 19 of the section 15 by means of bolts 20, whereby a two-part separable upper knuckle member is provided. Within the knuckle member thus formed is a cylindrical sleeve 21 which is provided at its lower end with an outwardly extending horizontal flange 22 adapted to extend under the sections 15 and 17 of the knuckle member. This flange is provided with an annular flange 23 extending longitudinally of the cylindrical portion of the sleeve and which flange is adapted to enter a groove 24 formed in the axle and which is preferably provided with a packing 25. The interfitting flange and groove provide a labyrinth or interrupting surface which serves to exclude dirt and dust and also to effectively retain the oil within the bearing.

Mounted within the sleeve 21 is a bushing 26 constituting a bearing for the upper cylindrical portion of a hollow pivot pin 27. This pin is provided at its upper end with a hollow nut 28 which is inclosed by a cap 29 forming an oil receiving chamber.

The central portion of the pivot pin is tapered and fits within a correspondingly shaped seat in the axle, while the lower part of the pin is cylindrical and extends within the lower knuckle member. This lower knuckle member is formed by the section 16 and a semi-cylindrical section 30 which is formed integral with the connecting steering tube 13 and which is connected with the section 16 by means of bolts 31.

A cylindrical oil retaining member or cup 32 provided with a closed head or end 33 is adapted to be seated within the knuckle formed by the two sections 16 and 30 and is provided at its upper end with a horizontal flange 34 adapted to rest upon the upper face of the knuckle member and be supported thereby and having its head 33 closing the lower open end of the knuckle.

The flange 34 is provided with an annular flange 35 extending longitudinally of the longer axis of the cylinder of the cup and which is adapted to enter groove 36 preferably provided with suitable packing and formed in the axle 10.

Between the lower end of the pivot pin and the head 33 of the oil retainer is mounted a thrust plate 37 which is adapted to receive the downward thrust of the pivot pin. This thrust plate has a channel 38 therethrough communicating with the open central bore of the pivot pin to permit the passage of oil therethrough. This thrust plate is provided with a lower spherical surface bearing against a complementary surface on the inner face of the head 33 of the oil retainer whereby the thrust plate will center itself in its seat automatically and adjust itself to conditions produced by wear.

While I have described one specific embodiment of my invention it should be understood that the invention is capable of modification and that modifications and changes may be made without departing from the spirit or scope of the invention as expressed in the following claims.

Having thus described my invention, what I claim and desire to secure by Letters Patent is:

1. A steering knuckle having a spindle knuckle member, an axle, a pivot pin, an oil retaining cup mounted between the pin and knuckle member and having a supporting flange engaging the upper surface of said member, a flange extending longitudinally of the cup from said supporting flange, said axle being grooved to receive said second flange.

2. A steering knuckle having a two-part separable knuckle member, an oil retaining cup having a flange supported by said knuckle member, a pivot pin mounted in said cup, and a second knuckle member supported on said pin, said cup and second knuckle member having interfitting portions for preventing the escape of oil.

3. A steering knuckle including a spindle knuckle member, an oil retaining cup having a slip fit in said member, and having a portion supported on said member, a pivot pin mounted in said cup, and an axle knuckle member supported on said pin, said second knuckle member and said cup having interfitting portions to prevent the escape of oil.

4. A steering knuckle comprising a member having two-part separable upper and lower knuckle members, an oil retaining cup carried by said lower knuckle member and supported thereon, a pivot pin supported in said cup and a knuckle member supported on said pivot pin.

5. A steering knuckle comprising a member having upper and lower two-part steering knuckle members, an oil retaining cup mounted in the lower steering knuckle member and having a flanged supported thereon, a flanged bushing mounted in the upper steering knuckle member, a pivot pin supported in the oil retaining cup, and a knuckle member mounted on said pivot pin intermediate the upper and lower steering knuckle members, and having portions interfitting with portions of the oil retaining cup and bushing for preventing the escape of oil.

6. A steering knuckle including a spindle having upper and lower steering knuckle sections, a lever having a section completing the upper steering knuckle member, an arm having a section completing the lower steering knuckle member, an oil retaining cup carried by the lower steering knuckle member, a pivot pin mounted in said cup and an axle knuckle member mounted on said pivot pin.

In testimony whereof I affix my signature.

FRANK J. DRUAR.